United States Patent Office 2,797,649
Patented July 2, 1957

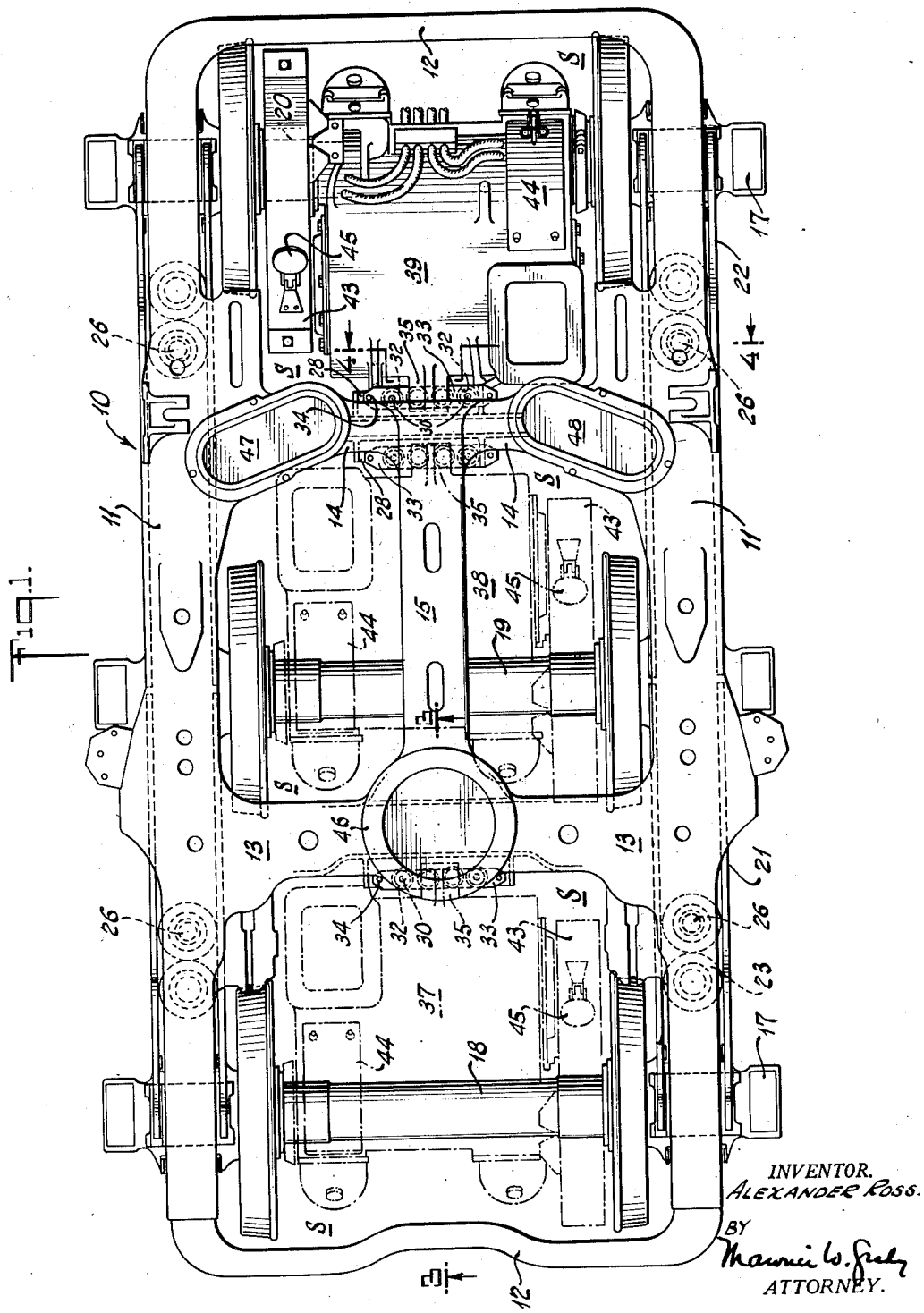

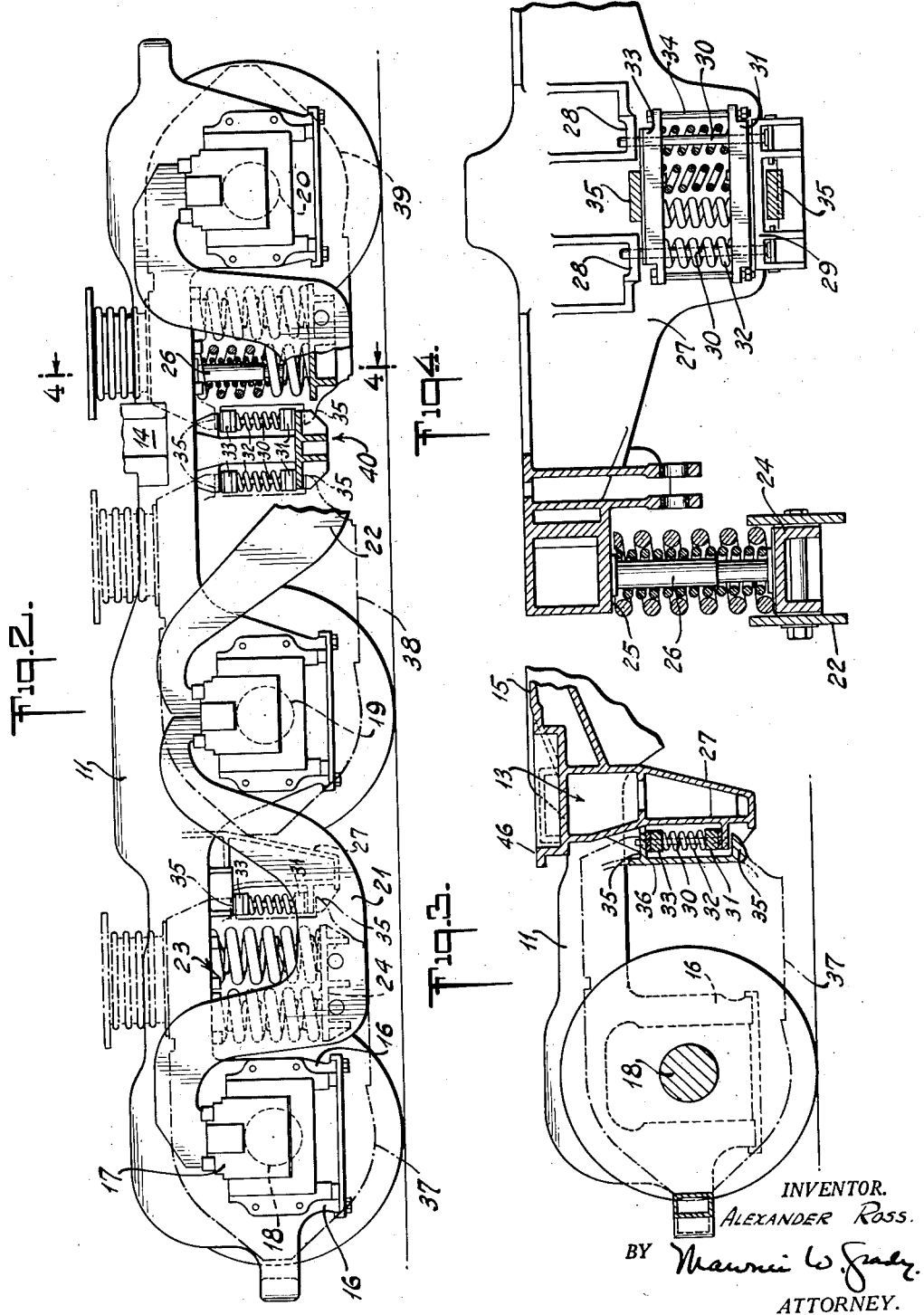

2,797,649
RAILWAY VEHICLE TRUCKS

Alexander Ross, Schenectady, N. Y., and Adelbert C. Wintemberg, Drexel Hill, and Thomas R. Gilchrist, Yeadon, Pa., assignors to Alco Products, Inc., New York, N. Y., a corporation of New York Application August 17, 1951, Serial No. 242,213

8 Claims. (Cl. 105—196)

This invention relates to a railway vehicle truck and particularly to such a truck for an electrically powered locomotive of the class in which the traction motors are axle-supported.

It has long been obvious that a third traction motor would be desirable to provide additional tractive effort to drive a six-wheel truck of the class used for heavy duty locomotives such as road switchers. Obstacles to a satisfactory design of such a truck have been dimensional limitaitons, such as the length and height of the truck, the necessity of ready servicing accessibility of components, particularly the traction motors, and the requirements of equal weight distribution.

The principal object of the invention, therefore, is to provide a six-wheel locomotive truck equipped with three axle-hung motors so arranged that the truck will have smooth riding characteristics, ready accessibility of its components, particularly the traction motors, equal weight distribution, and satisfactory over-all length and height dimensions.

Another object is to provide a six-wheel, three motor truck having a novel arrangement of the axles and truck bolsters which will permit two motors to be supported from one bolster at a lower than normal height so that the truck will have a low center of gravity but will provide satisfactory servicing accessibility to the center motor.

Another object is to provide such a truck in which the load-carrying elements are so arranged that unequal spacing of the axles is permitted thereby allowing the installation of three motors which will be easily accessible for servicing without the necessity of dismantling the truck.

Other and further objects of the present invention will be apparent from the following specification, the appended claims and the accompanying drawings.

In the drawings:

Fig. 1 is a plan view of the truck showing two of the motors in phantom and the rear motor in solid form.

Fig. 2 is an elevational view of the truck with the long equalizers broken to show the spring motor support.

Fig. 3 is a partial sectional view taken on the line 3—3 of Fig. 1, and

Fig. 4 is a partial sectional view taken on the line 4—4 of Figs. 1 and 2.

Turning now to the drawings, the invention is shown in Fig. 1 as a rigid bolster type truck having a main frame casting, generally indicated at 10, which comprises side members 11, end pieces 12, an outboard or forward bolster 13, an inboard or rear bolster 14, and a longitudinal transom 15 connecting the bolsters. The side members (see Fig. 2) have conventional pedestals 16 extending downwardly to include the journal boxes 17 mounted upon the axles 18, 19, and 20 in well-known manner. It should be here noted, as shown in Fig. 1, that the bolsters 13 and 14 are disposed, respectively, between axles 18 and 19 and between axles 19 and 20; and also that the center axle 19 is disposed appreciably nearer to the forward or outboard axle than to the rear or inboard axle. It of course follows from such unequal spacing of the wheel and axle assemblies that the frame-supporting equalizers 21 and 22 (see Fig. 2) are of unequal length. The arrangement of the bolsters between the wheel and axle assemblies permits utilization of the space or recess between the wheels directly above each track rail. The bolsters are disposed in such recesses at a lower than normal level so that the overall truck height is kept at a minimum.

Frame supporting helical spring assemblies, generally indicated as 23, are conventionally mounted upon four plates 24 which extend transversely of the truck between each of the four pairs of equalizers. These spring assemblies yieldably engage a suitable bearing surface 25 on the underside of the side members 11. Friction type snubbers 26 are provided as shock absorbers for the action of the springs. The truck frame is thus yieldably supported upon four pairs of double drop equalizers.

Depending from bolsters 13 and 14 (see Figs. 3 and 4) and integral therewith is a motor support 27. A pair of apertured ears 28 and an apertured shelf 29 extend forwardly from the wall of the support and are arranged with the ears above the shelf for the reception of guide pins 30. Bar 31 is positioned across shelf 29 and serves to support springs 32 (four in the drawing), the latter being confined by bar 33 which is slidably secured to the lower bar by bolts 34. Extensions 35 are formed on motor housing 36 and ride on bars 31 and 33 to resiliently carry the rear end of the forward motor unit 37. The forward end of the motor unit engages the axle 18 in conventional manner that need not be here described.

Motor units 38 and 39 are supported by the axles and frame by a construction similar to that just described as supporting motor unit 37. This construction is a duplex unit and is generally indicated at 40 in Fig. 2. Springs 32 serve to support the forward end of motor unit 39 and similar springs 32 support the rear end of motor unit 38. The opposite ends of units 38 and 39 are axle-supported in conventional manner. It thus can be seen that three motors are provided to drive the truck, and that the center and rear motors are hung between bolster 14 and the center and rear axles respectively. Such a novel design is made possible by the additional space resulting from the arrangement of the center wheel and axle assembly at a greater disance from the rear wheel and axle assembly than from the forward assembly. The rear bolster 14 thus can function as a common support for the adjacent ends of motor units 38 and 39.

The three motors shown are of conventional design and their armature shafts are provided with pinions to engage driving gears on the axles. Gear housings 43 and commutator covers 44 are conventional, but it is important to note that as the result of the novel arrangement of the motors such housings and covers are easily accessible for servicing. Ample spaces (indicaed in six places at S in Fig. 1) are provided to enable a mechanic to reach the commutator inspection covers 44 and gear case covers 45 from a pit below the locomotive. The commutator requires periodic brush replacement which of course must be done manually. The gears also require greasing at intervals, which is a manual operation. Accessibility requirements therefore are considerable and are met by the design of the invention. Ample space is available for a service man to emerge from a pit below the truck and stand erect within the truck structure to perform the work above described. No dismantling of the truck is required.

The arrangement of the center bolster offset toward the forward or outboard end of the truck necessitates a departure from conventional practice in order to provide equal distribution of the load upon the wheels. A center plate 46 is used as a turning point for the truck in conventional manner but it carries only a portion of the load. The remainder of the load is carried by the two supporting pockets 47 and 48 disposed on the rear bolster 14. These pockets receive pads (not shown) fixed to the underframe of the locomotive superstructure. Such a three point system of loading takes advantage of the deep bolsters so that the center of gravity of the superstructure is considerably lowered. In the design of the invention the overall truck height is from 6 to 8 inches lower than would be possible with the conventional swivel truck design in which, for balance, the center plate and all stress members would have to be directly above the center traction motor. In this connection it should be mentioned that the load-carrying pads are so arranged that they exert a righting reaction against tipping forces when the locomotive is rounding a curve. Furthermore, friction between the pad and bolster surfaces resists the tendency of the locomotive superstructure to "nose" at high speed or the truck to "hunt" on a curve.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What we claim is:

1. A six-wheel railway truck comprising three unequally-spaced wheel and axle assemblies, equalizers supported thereon, spring units carried by the equalizers, a main frame supported on the springs, a first bolster integral with the frame disposed between the forward and center assemblies, a second bolster integral with the frame disposed between the rear and center assemblies, and a plurality of load-distributing means on the frame including a center plate on the first bolster and laterally spaced means integral with the second bolster, said means being adapted to support the superstructure of the vehicle.

2. A six-wheel railway truck comprising three unequally-spaced wheel and axle assemblies; a unitary frame resiliently supported on such assemblies, such frame including integral bolsters, one disposed between the forward and center assemblies and one between the center and rear assemblies; and a plurality of means on the frame adapted to support the vehicle superstructure, such supporting means including a center plate on the bolster between the forward and center assemblies and laterally spaced means integral with the other bolster.

3. A six-wheel railway truck comprising three unequally-spaced wheel and axle assemblies, the center assembly being nearer to the forward than to the rear assembly; equalizers supported thereon; a main frame resiliently supported on the equalizers, said frame including integral cross bolsters connected by a longitudinal member, one of the bolsters being disposed between the center and forward assemblies and the other bolster between the center and rear assemblies; and means on the bolsters to receive the vehicle superstructure, including a center plate on the forward bolster and laterally spaced pockets on the rear bolster.

4. A railway truck comprising three wheel and axle assemblies, the central assembly being spaced nearer to the forward than to the rear assembly; a frame resiliently supported on the assemblies, said frame having two integral cross bolsters, one disposed between the central assembly and each end assembly; three axle-hung wheel-driving motors, one of which is suspended between the forward assembly and the adjacent bolster, and the others of which are suspended between the other bolster and the central and rear assemblies respectively; and a center plate on the bolster adjacent the forward assembly and two means on the bolster adjacent the rear assembly and integral with said bolster adapted to receive three point supporting means on the vehicle superstructure.

5. In a railway truck, three wheel and axle assemblies, equalizers extending lengthwise of the truck with their ends carried on adjacent assemblies, springs mounted on said equalizers between adjacent assemblies, a rigid truck frame mounted on said springs and having a central unyielding support for the load on the truck between the middle assembly and one end assembly, and having two transversely spaced unyielding supports for the load on the truck between the middle assembly and the other end assembly, said latter-mentioned supports providing bearings elongated transversely of the truck for sliding action of the vehicle body thereon.

6. In a railway truck, three wheel and axle assemblies, equalizers between adjacent assemblies, springs mounted on said equalizers between adjacent assemblies, a rigid truck frame mounted on said springs, an individual driving motor for each assembly carried by the respective assembly and an adjacent portion of the truck frame, said frame having an unyielding center plate support for the truck load between the motor on the middle assembly and the motor on one end assembly, and having two unyielding supports for the truck load spaced transversely of the truck and positioned between the motor on the middle assembly and the motor on the other end assembly.

7. In a railway truck, three wheel and axle assemblies, equalizers extending between the middle assembly and each end assembly, springs on said equalizers between adjacent assemblies, and a truck frame mounted on said springs, three body-engageable support members rigid with said frame, one being on the longitudinal center line of the truck at one side of the middle assembly and forming a pivot bearing for swiveling the truck on a vehicle body mounted thereon and the other two support members being spaced apart transversely of the truck and being on the other side of said assembly and being elongated in a direction substantially tangent to arcs having the pivot bearing as a center.

8. In a railway truck, three axle and wheel assemblies, a rigid truck frame supported therefrom and including side members and transverse transoms connecting said side members and positioned intermediate the middle axle and each end axle, a motor on each assembly including a housing projecting from the axle longitudinally of the truck with its projected ends supported from an adjacent transom, one of said housing projected ends being supported from one of the transoms and the other two housing projected ends being supported from the other transom, vehicle body sliding bearings carried directly on the latter-mentioned transom near the opposite sides of the truck, and a vehicle body sliding center support carried directly upon the other transom at the longitudinal center of the truck and forming part of a swivel connection for the truck and body.

References Cited in the file of this patent

UNITED STATES PATENTS

| 975,303 | Vauclain | Nov. 18, 1910 |
| 1,895,500 | Todd | Jan. 31, 1933 |
| 2,252,382 | Lanning | Aug. 12, 1941 |

FOREIGN PATENTS

| 876,205 | France | Oct. 30, 1942 |